United States Patent
Zhang

(10) Patent No.: US 8,881,681 B2
(45) Date of Patent: Nov. 11, 2014

(54) COMPOSITIONS USEFUL AS ANIMAL LITTERS

(71) Applicant: Nestec SA, Vevey (CH)

(72) Inventor: Yimin Zhang, Ballwin, MO (US)

(73) Assignee: Nestec SA, Vevey (CH)

( * ) Notice: Subject to any disclaimer, the term of this patent is extended or adjusted under 35 U.S.C. 154(b) by 0 days.

(21) Appl. No.: 14/254,314

(22) Filed: Apr. 16, 2014

(65) Prior Publication Data

US 2014/0224181 A1    Aug. 14, 2014

Related U.S. Application Data

(63) Continuation of application No. 13/444,384, filed on Apr. 11, 2012, now Pat. No. 8,739,735.

(60) Provisional application No. 61/586,896, filed on Jan. 16, 2012.

(51) Int. Cl.
*A01K 1/015*    (2006.01)

(52) U.S. Cl.
CPC ............... *A01K 1/0155* (2013.01); *A01K 1/015* (2013.01)
USPC ....................................................... 119/171

(58) Field of Classification Search
CPC ... A01K 1/015; A01K 1/0154; A01K 1/0155; A01K 29/00
USPC .......................................... 119/171, 172, 165
See application file for complete search history.

(56) References Cited

U.S. PATENT DOCUMENTS

| | | | |
|---|---|---|---|
| 3,677,886 A | 7/1972 | Forssblad et al. | |
| 4,727,824 A * | 3/1988 | Ducharme et al. | 119/171 |
| 5,526,770 A * | 6/1996 | Kiebke | 119/171 |
| 5,542,374 A * | 8/1996 | Palmer, Jr. | 119/173 |
| 6,053,125 A * | 4/2000 | Kory et al. | 119/171 |
| 6,098,569 A * | 8/2000 | Kent et al. | 119/171 |
| 6,543,385 B2 * | 4/2003 | Raymond et al. | 119/171 |
| 6,568,349 B1 * | 5/2003 | Hughes et al. | 119/171 |
| 6,635,344 B1 * | 10/2003 | de Almeida et al. | 428/326 |
| 7,757,638 B2 * | 7/2010 | Wang et al. | 119/173 |
| 7,942,113 B2 * | 5/2011 | Chen | 119/171 |
| 8,490,578 B2 * | 7/2013 | Hughes | 119/171 |
| 2001/0009142 A1 | 7/2001 | Otsuji et al. | |
| 2003/0131799 A1 | 7/2003 | Wong et al. | |
| 2005/0279654 A1 | 12/2005 | Robles | |
| 2009/0217882 A1 * | 9/2009 | Jenkins | 119/173 |

* cited by examiner

*Primary Examiner* — Yvonne Abbott
(74) *Attorney, Agent, or Firm* — Julie M Lappin; Benjamin J. Sodey

(57) ABSTRACT

The invention provides a composition suitable for use as an animal litter comprising a first component having a density less than that of liquid and a second component having a density of at least 5 lb/ft$^3$ (80 mg/cm$^3$) greater than the first component. The invention is based upon the discovery that adding liquid such as urine to a composition having two components with significant differences in density, one of which is less than the density of the liquid, will result in the component with the lesser density floating to the top of the liquid while the component with the greater density will segregate below the component with the lesser density.

24 Claims, No Drawings

COMPOSITIONS USEFUL AS ANIMAL LITTERS

CROSS REFERENCE TO RELATED APPLICATIONS

This application is claims priority to U.S. Application Ser. No. 13/444,384, filed Apr. 11, 2012 which claims priority to U.S. Provisional Application No. 61/586,896, filed Jan. 16, 2012, the disclosures of which are incorporated herein by this reference.

BACKGROUND OF THE INVENTION

1. Field of the Invention

The invention relates generally to compositions suitable for use as animal litters and particularly to animal litters having enhanced organoleptic properties after use.

2. Description of Related Art

Natural animal litters made of plants and plant materials are known in the art. For example, U.S. Pat. No. 6,635,344 discloses corncob based litters having a content of less than 1% of fines by weight and a moisture content below 10%. U.S. Pat. No. 6,053,125 discloses cat litters made from heavy density corncob grit and corncob chaff and pith with a coating of mineral oil and guar gum. U.S. Pat. No. 4,296,709 discloses an animal litter based on corncob grits. Similarly, U.S. Pat. No. 4,619,862 discloses paper products useful as an animal litter. U.S. Pat. No. 5,352,780 discloses an animal litter made from ground cellulose. U.S. Pat. No. 3,980,050 discloses a poultry litter made from low density bark and cellulosic fibrous material adhered to and carried by the bark. U.S. Pat. No. 3,941,090 disclosed cedar based litters made using cedar particles, an alfalfa binder, and water. U.S. Pat. No. 5,927,049 discloses yellow pine wood animal litters useful for controlling animal waste. U.S. Pat. No. 5,542,374 discloses an animal litter made using clay and western red cedar. U.S. Pat. No. 5,044,324 discloses wood fiber crumbles made from cedar and used as an animal litter. In addition, U.S. Pat. No. 5,884,584 discloses an animal litter made from pine wood, alfalfa and poplar wood, especially aspen. U.S. Pat. No. 6,837,181 discloses a litter made from wood particles and wood shavings, and baking soda, where wood particles and wood shavings are from pine and aspen, wherein the litter is useful for small household pets, e.g., rabbits, guinea pigs, and monkeys, and large animals. U.S. Pat. No. 6,622,658 and its family disclose animal litters made from grains. U.S. Pat. No. 6,220,206 discloses controlled density cat litters made grain milling byproducts such as corn and wheat processing byproducts.

In contrast to traditional clay-based litters, natural litters are biodegradable, lightweight, and create relatively little dust when used. However, natural litters typically have poor clumping strength and little odor control. Wood-based litters have desirable organoleptic properties after use but often have poor clumping strength when wetted by urine or other animal waste. Grain-based litters often form strong clumps but do not have desirable organoleptic properties after use, e.g., have less than desirable appearance and aroma.

Generally, all these litters function for their intended purpose, e.g., managing animal urine and feces. Further, the litters may, in some circumstances, be used for other purposes, e.g., absorbing environmental contaminants or treating waste water. However, as stated, these litters often do not have desirable organoleptic properties after use, e.g., an appealing aroma and visual appearance. Therefore, there is a need for new compositions useful as animal litters that have enhanced organoleptic properties after the compositions have been used.

SUMMARY OF THE INVENTION

It is, therefore, an object of the invention to provide compositions suitable for use as animal litters having enhanced organoleptic properties after use.

It is another object of the invention to provide compositions suitable for use as animal litters having enhanced clumping properties.

It is another object of the invention to provide compositions suitable for use as animal litters having a more desirable appearance after use.

It is a further object of the invention to provide compositions suitable for use as animal litters having a more desirable aroma after use.

These and other objects are achieved using compositions suitable for use as animal litters comprising a first component having a density less than that of a liquid and a second component having a density of at least 5 lb/ft$^3$ (80 mg/cm$^3$) greater than the first component. When a liquid is added to the composition, the two components segregate. The less dense first component floats to the top of the surface of the liquid and the more dense second component absorbs the liquid at a greater rate than the first component and remains below the surface of the liquid underneath the second component. This results in a composition with a more desirable appearance and aroma due to the first component and a firm and strong clump due to the second component. The first component is selected based upon its density and its desirable appearance and aroma; the second component is selected based upon its density and its absorption and clumping properties.

Additional and further objects, features, and advantages of the invention will be readily apparent to those skilled in the art.

DETAILED DESCRIPTION OF THE INVENTION

Definitions

The term "liquid" means water or water with dissolved solids or compounds comprising less than 5% of the liquid by weight. Examples of a liquid with dissolved solids or compounds are urine and waste water such as waste water from treated sewage. Generally, the density of a liquid ranges from about 1g/cm$^3$ (62.5 lb/ft$^3$) to about 1.035 g/cm$^3$ (64.6 lb/ft$^3$). Any material with a lower density than the liquid, and does not absorb the liquid quickly, will float on the liquid.

The Invention

In one aspect, the invention provides a composition suitable for use as an animal litter. The composition comprises a first component having a density less than that of a liquid and a second component having a density of at least 5 lb/ft$^3$ (mg/cm$^3$) greater than the density of the first component. The invention is based upon the discovery that adding a liquid such as urine to a composition having two (or more) components with significant differences in density, one of which is less than the density of the liquid, will result in the component with the lesser density floating to the top of the liquid while the component with the greater density segregates below the component with the lesser density. When the component with the lesser density is chosen from materials that have one or more desirable properties (e.g., a pleasing aroma or a pleasing appearance), such component segregates to the top of the composition when the liquid is added to the composition, e.g., when an animal urinates on the composition. The component with the greater density, preferably one that absorbs liquid at a greater rate and in a greater amount than the component with the lesser density, absorbs the majority of the liquid and segregates to the bottom of the composition. As a result, all or most of the liquid is partially covered by the component with the lesser density. This means that the liquid with the unpleasant organoleptic properties is concentrated in the component with the greater density and covered by the component with the lesser density, i.e., the component with the pleasing organoleptic properties. Consider, for example, a litter having cedar wood as the less dense component and corncob as the more dense component. When urine is added to the composition, the cedar will float to the top of the composition and the corncob will absorb the majority of the urine and segregate to the bottom of the composition under the cedar. Individuals dealing with the litter experience the pleasant appearance and aroma of cedar while avoiding most of the malodor and appearance of urine.

The first component is any suitable material having a density less than that of the liquid added to the composition. In some embodiments, the first component is a wood such as cedar, pine, oak, maple, eucalyptus, aspen, yucca, or combinations thereof. In preferred embodiments, the first component is cedar or pine, more preferably cedar. In various embodiments, the pine is New Zealand Pine or Southern Yellow Pine and the cedar is Western Red Cedar. In preferred embodiments, the wood contains oils and/or resins that exhibit antimicrobial properties when used, e.g., cedar and pine.

In other embodiments, the first component is a grain such as alfalfa, corn stalk, corn flour, oat hull, oat stalk, oat flour, barley hull, barley meal, barley stalk, barley flour, wheat hull, wheat straw, wheat flour, soybean hull, soybean meal, soybean flour, rye hull, rye meal, rye straw, rye flour, rice straw, rice hull, sorghum straw, sorghum hull, or combinations thereof. In other embodiments, the first component is a plant such as bamboo, lemongrass, switchgrass, catnip, oregano, parsley, rosemary, sage, thyme, valerian root, alyssum, chrysanthemum, honeysuckle, hops, lavender, apples, berries, orange peels, orange pulp, sunflower hulls, coffee, tea, or combinations thereof. In other embodiments, the first component is sawdust, paper, cellulose, or combinations thereof. Generally, the first component has properties that make it desirable to have the first component in a position where it interacts with an animal using the composition. For example, the first component may be visually pleasing or have a pleasing aroma. In preferred embodiments, the first component has a pleasing visual appearance and/or releases a natural aroma when contacted with one or more liquids.

The composition comprises the first component in any amount needed to make the composition useful for its intended purpose. Generally, the first component comprises from about 2.5 to about 40% of the composition, preferably from about 5 to about 30%, more preferably from about 7.5 to about 20%.

The second component comprises one or more materials having a density of at least 5 lb/ft$^3$ (80 mg/cm$^3$) greater than the first component. In preferred embodiments, the second component has a density of at least 10 lb/ft$^3$ (160 mg/cm$^3$) greater than the first component. In other embodiments, the second component has a density of at least 15 lb/ft$^3$ (240 mg/cm$^3$) or more greater than the first component.

In preferred embodiments, the second component absorbs all or the majority of the liquid added to the composition. In more preferred embodiments, the second component absorbs more liquid than the first component. In other embodiments, the second component absorbs liquid at a greater rate than the first component. In preferred embodiments, the second component absorbs more liquid than the first component and absorbs liquid at a greater rate than the first component. Preferably, the second component forms clumps comprising the second component and the liquid (and possibly part of the first component) when liquid is added to the composition.

Any suitable material having a density of at least 5 lb/ft$^3$ (80 mg/cm$^3$) greater than the first component may be used as the second component. In some embodiments, the second component is a grain or a material derived from grain such as corncob, corn kernel, Distillers Dried Grain (DDG), corn pellet, oat pellet, barley pellet, wheat middlings, soybean pellet, rye pellet, rice grain, rice pellet, sorghum grain, sorghum pellet, or combinations thereof. In one preferred embodiment, the second component is corncob. In another, the second component is DDG or wheat middlings. In some embodiments, other materials may be used as the second component, such as sunflower seed, almond, pistachio, walnut, pecan, hazelnut, peanut, acorn, egg shells, silica gel, clay, sodium bentonite, or combinations thereof.

The composition comprises the second component in any amount needed to make the composition useful for its intended purpose. Generally, the second component comprises from about 60 to about 97.5% of the composition, preferably from about 70 to about 95%, more preferably from about 80 to about 92.5%.

The particle size of the first and second components is any particle useful to make the composition based upon its intended use. In preferred embodiments, the first component and the second component have a particle size from about 0.75 to about 3 mm, preferably from about 1 to about 2 mm, more preferably from about 1.25 to about 1.75 mm. In a preferred embodiment, at least 80% of the particles are within from about 0.6 to about 2 mm, preferably 85%, more preferably 90%.

In certain embodiments, the first component is one or more woods, preferably cedar or a mixture of cedar and pine, and the second component is grain or grain derived, preferably corncob. The wood has an appealing appearance and naturally releases an aroma when a liquid is added. The grain has excellent liquid absorption properties and will absorb the majority of the added liquid. Generally, the less dense wood will segregate to the top of the mixture when liquid is added and the grain will absorb the majority of the liquid and form a clump that segregates below the wood. The wood on top of the mixture will present a more desirable appearance and will release a desirable aroma due to the oils and resin from the wood. The wood also covers the clump and the urine to lessen the user's interaction with the urine and its malodor.

In a preferred embodiment, the composition is used and an animal litter. The first component is cedar and the second component is corncob. When and animal urinates on the litter, the cedar segregates to the top of the composition because of its lower density, it tends to float on the urine. Similarly, the corncob segregates to the bottom of the composition because of its higher density, and, in addition, because the corncob absorbs a relatively large portion of the urine when compared to the cedar. The cedar interfaces with the user and, because the cedar has an appealing appearance and aroma, makes the litter more appealing to the user than most litters. The corncob, having absorbed the majority of the urine, is at least partially hidden from the user because it is at least partially covered by the cedar. This configuration reduces the malodor or perception of the malodor of the urine to the user. In preferred embodiments, the composition comprises a binder that promotes clump formation wherein the corncob and wood particles form clumps that can be easily removed from the litter. In one embodiment, the binder is guar gum.

Generally, the liquid is added to the composition in any amount that does not interfere with the segregation of the first component and the second component. In preferred embodiments, the liquid is added to the composition in amounts of from about 1 to about 30% by weight of the composition.

In one embodiment, the second component has a density greater than 5 lb/ft$^3$ (80 mg/cm$^3$) that of the density of the first component after the components are wetted by a liquid. During the wetting process the first and second components will segregate vertically, i.e., the less dense component will segregate on top of the more dense component.

In another embodiment, the second component has a density greater than 10 lb/ft$^3$ (160 mg/cm$^3$) the density of the first component when the components are dry. Then, during and after the wetting process when a liquid is added to the composition, the components will segregate vertically.

In other embodiments, the composition of the invention further comprises one or more binders that promote clump formation, particularly by the second component. Any binder that promotes clump formation can be used. Binders useful in the invention include gums, starches, pectins, agar agar, gelatin, alginates, carrageenans, or proteins. Specific examples include locust bean gum, xanthan gum, arabic gum, cassia gum, gelatin, wheat gluten, blood plasma, soy protein, carboxymethylcellulose (CMC), or dairy proteins. In one preferred embodiment, the binder is guar gum. When added, the binders comprise from about 0.5 to about 10% of the composition, preferably from about 1 to about 6%.

In some embodiments, the composition further comprises materials that enhance the function and properties of the composition. Examples of such agents include antimicrobials, malodor reducing materials, fragrances, health indicating materials, color altering agents, dust reducing agents, superabsorbent materials, cyclodextrins, zeolites, activated carbon, baking soda, pH altering agents, salt forming materials, ricinoleates, or combinations thereof. When added, the agent is added in any useful amount. Generally, the agent comprises from about 0.01 to about 2% of the composition, preferably from about 0.05 to about 1%, depending on the agent and its use.

The compositions of the invention are useful for a variety of purposes. For example, the compositions can be used to treat water, wastewater, liquid spills, and the like. Preferably, the compositions are used as an animal litter.

In another aspect, the invention provides methods for managing waste, particularly animal waste such as urine. The methods comprise contacting the animal waste with a composition comprising a first component having a density less than that of liquid and a second component having a density of at least 5 lb/ft$^3$ (80 mg/cm$^3$) greater than the first component. Generally, the composition, i.e., litter, is placed in a litter box or other suitable container and the animal is allowed to deposit its waste (urine or feces, but preferably urine) so that it comes in contact with the composition. If desirable, the composition can be placed in contact with the waste after the waste is deposited, e.g., on a lawn.

In another aspect, the invention provides an animal litter box comprising a device suitable for containing animal litter and suitable for use by an animal when excreting animal waste and one or more compositions of the invention. The device is any device suitable for use by an animal and compatible with an animal litter of the invention. Many such devices are known in the art and available commercially, e.g., the litter boxes disclosed in US20090250014A1, US20090272327A1, US20090000560A1, US20070277740A1, U.S. Pat. No. 7,628,118, and the like.

In a further aspect, the invention provides kits suitable for containing compositions useful for managing animal waste. The kits comprise in separate containers in a single package or in separate containers in a virtual package, as appropriate for the kit component, a composition of the invention and one or more of (1) a device suitable for containing the composition and suitable for use by an animal when excreting animal waste, e.g., a litter box; (2) a device suitable for handling animal waste that has been deposited with the composition, e.g., a scoop for removing animal feces from a litter (e.g., U.S. Pat. No. 7,523,973) or a rake suitable for arranging an animal litter in a litter box or other container; (3) a different animal litter, e.g., a different animal litter suitable for creating a mixture of the litter of the invention and such different animal litter; (4) instruction for how to use the litter to manage animal waste; and (5) instructions for how to dispose of the composition, e.g., how to dispose of the litter in an environmentally friendly manner, particularly after it has been used.

When the kit comprises a virtual package, the kit is limited to instructions in a virtual environment in combination with one or more physical kit components. The kits may contain the kit components in any of various combinations and/or mixtures. In one embodiment, the kit contains a package containing the composition of the present invention and a scoop suitable for removing animal waste from the composition.

In another aspect, the invention provides packages comprising a material suitable for containing a composition of the invention and a label affixed to the package containing a word or words, picture, design, acronym, slogan, phrase, or other device, or combination thereof, that indicates that the contents of the package contains a composition of the invention, e.g., information about the composition's enhanced clumping properties, more desirable appearance, and effective malodor control or other physical, functional, or related properties. Typically, such device comprises the words "all natural litter" or "natural ingredients" or "environmentally friendly litter" or "animal litter having enhanced clumping properties" or "strong clumping" or "animal litter having effective odor control" or "effective odor control" or "animal litter having a pleasing aroma" or an equivalent expression printed on the package. Any package or packaging material suitable for containing animal litters is useful in the invention, e.g., a bag, box, bottle, can, pouch, and the like manufactured from paper, plastic, foil, metal, and the like. In one embodiment, the package further comprises a composition of the invention.

In another aspect, the invention provides a means for communicating information about or instructions for using a composition of the invention for one or more of (1) managing wastes, e.g., animal waste such as animal urine and feces; (2) enhancing the organoleptic properties of litter, particularly after use; and (3) disposing of the used composition. The means comprises a document, digital storage media, optical storage media, audio presentation, or visual display containing the information or instructions. In certain embodiments, the communication means is a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof. Useful information includes one or more of (1) methods and techniques for training or adapting an animal to use the litter; (2) functional or other properties of an animal litter of the invention, particularly those relating to the enhanced clumping properties and effective malodor control; and (3) contact information for to use by a consumer or others if there is a question about the litter and its use. Useful instructions include methods for cleaning and disposing of the litter. The communication means is useful for instructing on the benefits of using the present invention and communicating the approved methods for using the invention for an animal.

In another aspect, the invention provides methods for enhancing the organoleptic properties of animal wastes. The methods comprise contacting the animal wastes with a composition comprising a first component having a density less than that of a liquid and a second component having a density of at least 5 lb/ft$^3$ (80 mg/cm$^3$) greater than the first component. Generally, the litter is placed in a litter box or other suitable container and the animal is allowed to deposit its waste so that it comes in contact with the litter. Upon contact, the first component, which has properties pleasing to the senses as described herein, segregates to the top of the litter. The animal waste is absorbed by the second component and segregates to the bottom of the litter. As a result, the unpleasant organoleptic properties of the animal waste are subdued and the overall organoleptic properties of the animal waste are enhanced or improved. In one embodiment, the animal waste is urine. The organoleptic properties enhanced or improved include sight, smell, and touch, preferably sight and smell, more preferably smell. In a preferred embodiment, the litter comprises cedar and corncob. When urine is contacted with the litter, the cedar segregates to the top of the litter and the corncob absorbs the majority of the urine and segregates to the bottom of the litter. The cedar has pleasing organoleptic properties, e.g., it has a pleasant appearance and aroma. The litter user, e.g., an animal caregiver, interacts more with the more pleasant first component and less with the less pleasant second component.

EXAMPLES

The invention can be further illustrated by the following examples, although it will be understood that the examples are included merely for purposes of illustration and are not intended to limit the scope of the invention unless otherwise specifically indicated.

Example 1

A batch of litter comprising the composition shown in Table 1 (Formula 1) was made as follows. 10 parts of cedar wood and 85.5 parts of corncob were poured into a pan agglomerator (DP-14 Agglo-miser by Mars Mineral, Pa.). While the mixture was blended at a rate of about 60 rpm, 1 part of water was sprayed as a mist onto the mixture, followed by adding 3.5 parts of guar gum with continued mixing for five minutes ensuring a homogenous blend.

TABLE 1

| Litter Formulas | | | |
|---|---|---|---|
| Materials | Formula 1 | Formula 2 | Formula 3 |
| Cedar Wood[1] | 10 | 20 | 40 |
| Corncob[2] | 85.5 | 75.5 | 55.5 |

TABLE 1-continued

| Litter Formulas | | | |
|---|---|---|---|
| Materials | Formula 1 | Formula 2 | Formula 3 |
| Water[3] | 1 | 1 | 1 |
| Guar Gum[4] | 3.5 | 3.5 | 3.5 |
| Total | 100 | 100 | 100 |

[1]Cedar wood particles have an average particle size of 1.5 mm and a density of 0.13 g/cc. They are screened from wood particles of western red cedar. At least 90 wt % of the wood particles are within 10 to 30 US mesh size.
[2]Corncob particles have an average particle size of 1.5 mm and a density of 0.47 g/cc. They are screened from corncob granules. At least 90 wt % of the corncob particles are within 10 and 40 US mesh size.
[3]Deionized water was used in this experiment. Other water with neutral pH is suited for this application.
[4]Guar gum is a white powder with average particle size of about 50 microns.

Example 2

A second batch of litter of composition shown in Table 1 (Formula 2) was made as described in Example 1.

Example 3

A third batch of litter of composition shown in Table 1 (Formula 3) was made as described in Example 1.

Example 4

The density of each litter batch from Examples 1, 2, and 3 were then determined. A funnel shaped hopper was set at a fixed height of 6 inches above a 500 cm$^3$ cylinder. The hopper then was filled with litter from Example 1 while its spout was closed. The hopper spout was opened and litter flowed into the cylinder until it overflowed. Using a flat edge ruler, excess litter above the rim of the cylinder was removed. The weight of the litter was taken as the difference between the weight of the cylinder plus litter and that of the cylinder in grams (g). This weight was divided by 500 (cylinder volume) and the density expressed as g/cm$^3$. Density determinations were repeated for litter from examples 2 and 3. Results for the three litters are shown in Table 2. It is seen that as the cedar wood level increased, the density decreased.

TABLE 2

| Density of Litter Formulas | | | |
|---|---|---|---|
| | Example 1 | Example 2 | Example 3 |
| Density (g/cm$^3$) | 0.41 | 0.35 | 0.25 |

Example 5

The strength of the clumps formed when the litters were wetted was determined by the following procedure. For this experiment, 2% saline solution at room temperature was used to ensure consistency in physical and chemical properties. The litter was poured into a rectangular litter pan of 12×18 inch in size. After shaking and leveling the litters, the various sized granules are distributed in the pan in a random manner. The depth of the litter was at least 3 inches to ensure clumps do not contact the bottom of the container. To test the impact of method of liquid addition, litter was wetted with a liquid stream to simulate cats urinating and disturbing the litter particles (A); and separately sprayed with droplets of the liquid to avoid disturbance of the particles (B).

A. For clumps that incorporate natural segregation of light (wood) and heavy (corncob) particles, a self leveling 10 ml buret in a support stand was mounted at a height of 5 cm above surface of the animal litter. The liquid (2% saline solution) was dispensed onto the litter material. 5 more clumps were made with the same manner. This was done with litter from each of examples 1, 2, and 3.

B. To prepare clumps that do not have natural segregation of light (wood) and heavy (corncob) particles, we gradually sprayed 10 ml liquid from 5 cm above the litter surface to produce clumps of similar size and shape. No pooling of water was observed. This ensured the wood and corncob granules did not segregate due to their density difference.

After 24 hours, the clumps were tested by a Texture Analyzer (Model XT-Plus by Texture Technologies, N.Y.). The flat surface of the clump was rested onto two horizontal bars (TA-92A: self supporting three point bend/snap fixture) with a 50 mm gap in between. A $3^{rd}$ bar was moved from top down, at 1 mm/s, to bend and snap the clump. The force/distance data were recorded by the computer. For clarity, we only used the maximum force before break to describe the strength of each clump. The average values of 5 clumps are compared among formulas. The maximum breaking force values of each formula were averaged and tabulated and shown in Table 3.

TABLE 3

Clump Strength

|  |  | Max breaking force (kg) |
|---|---|---|
| Example 1 | Segregated | 0.268 |
|  | Un-Segregated | 0.107 |
| Example 2 | Segregated | 0.211 |
|  | Un-Segregated | 0.094 |
| Example 3 | Segregated | 0.256 |
|  | Un-Segregated | 0.079 |

From the results in Table 3 it is seen that the clumps that have heavy (corn corncob) and light (wood) particles segregated are more break resistant.

Example 6

Experimental procedure for clump appearance: For visual appearance (appeal due to predominance of wood particles), the 6 clumps were prepared with the same manner as those for clump strength test (example 5). 6 clumps were made for each formula. Saline solution (2%) was used for clump appearance evaluation. Similarly, for clumps without segregation, liquid was sprayed. Sensory tests were conducted at 1 hour and 24 hours after the clumps were prepared. 6 panelists were asked to rate the clump appearance between a score of 1 to 5 (1 being the best) and results shown in Table 4. Clearly, appearance due to concentration of the wood particles floating to the top had better scores after 1 and 24 hours.

TABLE 4

Clump Appearance

|  | Example 1 | | Example 2 | | Example 3 | |
|---|---|---|---|---|---|---|
|  | Segregated | Un-Segregated | Segregated | Un-Segregated | Segregated | Un-Segregated |
| After 24 hours - appearance | 2.0 | 3.2 | 1.8 | 3.2 | 1.8 | 3.0 |
| After 1 hour - appearance | 2.4 | 3.4 | 2.0 | 3.0 | 2.4 | 3.0 |

Example 7

For aroma evaluation, cat urine was used. The cat urine was collected in the cattery, frozen, and then thawed to room temperature before the experiment. The litter was filled into a cylindrical container of 8 cm in diameter and 10 cm in height to a height of about 7 cm. One clump was made by dispensing cat urine from 5 cm above the litter surface as with liquid in example 5. For clump without the natural segregation, cat urine was sprayed onto the litter surface as with liquid in example 5. Sensory tests were conducted at 1 hour and 24 hours after the clumps were prepared. 6 panelists were asked to rate the clump aroma between a score of 1 to 5 (1 being the best) and results shown in Table 5. Clearly, aroma scores were better after 1 and 24 hours when wood particles floated to the top.

TABLE 5

Clump Aroma

|  | Example 1 | | Example 2 | | Example 3 | |
|---|---|---|---|---|---|---|
|  | Segregated | Un-Segregated | Segregated | Un-Segregated | Segregated | Un-Segregated |
| After 24 hours - aroma | 2.0 | 3.0 | 1.6 | 2.4 | 1.0 | 2.2 |
| After 1 hour - aroma | 1.6 | 3.2 | 1.4 | 3.0 | 1.4 | 3.0 |

In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

As used herein and in the appended claims, the singular forms "a", "an", and "the" include plural reference unless the context clearly indicates otherwise. The terms "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of this invention. Although any compositions, methods, and means for communicating information similar or equivalent to those described herein can be used to practice this invention, the preferred compositions, methods, and means for communicating information are described herein.

All references cited above are incorporated herein by reference to the extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

What is claimed is:

1. A composition suitable for use as an animal litter comprising a first component having a density less than that of a liquid and a second component having a density of at least 5 lb/ft$^3$ greater than the density of the first component, wherein the first component comprises from about 2.5 to about 40% of the composition; the second component comprises from about 60 to about 97.5% of the composition; and the first component segregates from the second component by migrating toward the top of the composition when a liquid is added to the composition.

2. The composition of claim 1 wherein the first component is a wood.

3. The composition of claim 2 wherein the wood is cedar, pine, or a combination thereof.

4. The composition of claim 2 wherein the wood is cedar.

5. The composition of claim 1 wherein the second component has a density of at least 10 lb/ft$^3$ greater than the first component.

6. The composition of claim 1 wherein the second component absorbs liquid.

7. The composition of claim 1 wherein the second component is a grain.

8. The composition of claim 7 wherein the grain is corncob, corn kernel, Distillers Dried Grain (DDG), corn pellet, oat pellet, barley pellet, wheat middlings, soybean pellet, rye pellet, rice grain, rice pellet, sorghum grain, sorghum pellet, or a combination thereof.

9. The composition of claim 1 wherein the second component is corncob.

10. The composition of claim 1 wherein the second component clumps when liquid is added to the composition.

11. The composition of claim 1 wherein the first component is a wood and the second component is a grain.

12. The composition of claim 11 wherein the wood is cedar and the grain is corncob.

13. The composition of claim 1 wherein the first component and the second component have a particle size from about 0.75 to about 3 mm.

14. The composition of claim 1 wherein at least 80% of the first and second components have a particle size from about 0.6 to about 2 mm.

15. The composition of claim 1 wherein the composition further comprises one or more binders.

16. The composition of claim 15 wherein the binders are gums, starches, pectins, agar, gelatin, alginates, carrageenans, proteins, or a combination thereof.

17. The composition of claim 15 wherein the binders are locust bean gum, xanthan gum, arabic gum, cassia gum, gelatin, wheat gluten, blood plasma, soy protein, carboxymethylcellulose (CMC), dairy proteins, or a combination thereof.

18. The composition of claim 15 wherein the binder is guar gum.

19. The composition of claim 15 wherein the first component is cedar, the second component is corncob, and the binder is guar gum.

20. A method for managing waste comprising contacting the waste with a composition of claim 1.

21. The method of claim 20 wherein the waste is an animal waste.

22. The method of claim 20 wherein the waste is urine.

23. An animal litter box comprising (1) a device suitable for containing animal litter and suitable for use by an animal when excreting animal waste and (2) one or more compositions of claim 1.

24. An animal litter composition comprising a cedar wood component having a density less than that of a liquid and a corncob component having a density of at least 5 lb/ft$^3$ greater than the density of the first component, wherein the cedar wood component comprises from about 2.5 to about 40% of the composition; the corncob component comprises from about 60 to about 97.5% of the composition; and the cedar wood component segregates from the corncob component by migrating toward the top of the composition when a liquid is added to the composition.

* * * * *